United States Patent
Campos et al.

(10) Patent No.: US 10,797,796 B2
(45) Date of Patent: Oct. 6, 2020

(54) SYSTEMS AND METHODS FOR MULTIPATH AND REFLECTION COMPENSATION IN FULL DUPLEX COHERENT OPTICAL TRANSMISSIONS

(71) Applicant: CABLE TELEVISION LABORATORIES, INC, Louisville, CO (US)

(72) Inventors: Luis Alberto Campos, Superior, CO (US); Zhensheng Jia, Superior, CO (US)

(73) Assignee: Cable Television Laboratories, Inc., Louisville, CO (US)

(*) Notice: Subject to any disclaimer, the term of this patent is extended or adjusted under 35 U.S.C. 154(b) by 0 days.

(21) Appl. No.: 16/413,506

(22) Filed: May 15, 2019

(65) Prior Publication Data

US 2019/0356388 A1 Nov. 21, 2019

Related U.S. Application Data

(60) Provisional application No. 62/671,574, filed on May 15, 2018.

(51) Int. Cl.
H04B 10/2507 (2013.01)
H04J 14/06 (2006.01)

(52) U.S. Cl.
CPC .......... *H04B 10/2572* (2013.01); *H04J 14/06* (2013.01)

(58) Field of Classification Search
CPC ................... H04B 10/2569–2572; H04J 14/06
See application file for complete search history.

(56) References Cited

U.S. PATENT DOCUMENTS

2013/0336654 A1* 12/2013 Arikawa ............... H04B 10/614
398/65
2017/0085321 A1* 3/2017 Shibutani ........... H04B 10/2507

* cited by examiner

*Primary Examiner* — Casey L Kretzer
(74) *Attorney, Agent, or Firm* — Armstrong Teasdale, LLP

(57) ABSTRACT

A full duplex communication network includes a first coherent optics transceiver having (i) a first receiver, and (ii) a first transmitter configured to transmit a first dual polarized signal. The network further includes a second coherent optics transceiver having (i) a second receiver configured to receive the first dual polarized signal, and (ii) a second transmitter configured to transmit a second dual polarized signal. The network further includes an optical transport medium operably coupling the first coherent optics transceiver to the second coherent optics transceiver, and a first compensation module configured to filter (i) crosstalk between orthogonal components of the first dual polarized signal, and (ii) reflections between the first dual polarized signal and the second dual polarized signal.

20 Claims, 8 Drawing Sheets

SYSTEMS AND METHODS FOR MULTIPATH AND REFLECTION COMPENSATION IN FULL DUPLEX COHERENT OPTICAL TRANSMISSIONS

CROSS REFERENCE TO RELATED APPLICATIONS

This application claims the benefit of and priority to U.S. Provisional Patent Application Ser. No. 62/671,574, filed May 15, 2018, which is incorporated herein by reference in its entirety.

BACKGROUND

The field of the disclosure relates generally to communication networks, and more particularly, to bidirectional networks employing coherent optics technologies.

Most network operators have very limited fiber available between the headend (HE)/hub and the fiber node to use for data and video services, often only just 1-2 fiber strands. With end users demanding more bandwidth to the home, operators need a strategy on how to increase capacity in the access network. One way is to add more fiber between the HE/hub and the fiber node, but retrenching is costly and time consuming, so return on investment (RoI) makes this option unattractive. A solution that re-uses the existing infrastructure is therefore considerably preferable.

Coherent optics technology is becoming common in the subsea, long-haul, and metro networks, but has not yet been fully integrated into the access networks. However, it is desirable to utilize coherent optics technology in the access network because the distances from the HE/hub to the fiber node are much shorter using coherent optics technologies in comparison with conventional system technologies. One proposed technique for expanding the capacity of existing fiber infrastructures implements coherent optics bidirectional transmission on a single fiber. Bidirectional transmission effectively doubles (or more) the amount of transmission capability available to cable operators.

Bidirectional transmission is attractive to network operators that have limited availability of leased or owned fibers, and who desire separation of different services (residential, business, and cellular connections) to end users/endpoints of the network. However, existing coherent transceiver designs have been unable to fully leverage the capabilities of bidirectional transmission. Conventional coherent optical transceivers typically have one downstream optical port and an upstream optical port, and are implemented using the same laser both as the upstream optical source and as a local oscillator (LO). Thus, conventional coherent optical transceivers implementations use the same wavelength for upstream and downstream communication. However, such implementations also typically require two separate fibers for each respective direction of the bidirectional communication. For example, the single laser source used for both the transmitter and the LO results in significant crosstalk that has prevented use of a single fiber for the bidirectional transmission.

Accordingly, it is desirable to develop systems and methods that successfully implement coherent optics technology for bidirectional transmission in scenarios where only a single fiber is available to a remote location, such as, for example, a cable access environment.

SUMMARY

In an embodiment, a full duplex communication network includes a first coherent optics transceiver having (i) a first receiver, and (ii) a first transmitter configured to transmit a first dual polarized signal. The network further includes a second coherent optics transceiver having (i) a second receiver configured to receive the first dual polarized signal, and (ii) a second transmitter configured to transmit a second dual polarized signal. The network further includes an optical transport medium operably coupling the first coherent optics transceiver to the second coherent optics transceiver, and a first compensation module configured to filter (i) crosstalk between orthogonal components of the first dual polarized signal, and (ii) reflections between the first dual polarized signal and the second dual polarized signal.

BRIEF DESCRIPTION

These and other features, aspects, and advantages of the present disclosure will become better understood when the following detailed description is read with reference to the accompanying drawings in which like characters represent like parts throughout the drawings, wherein.

Figure 1:
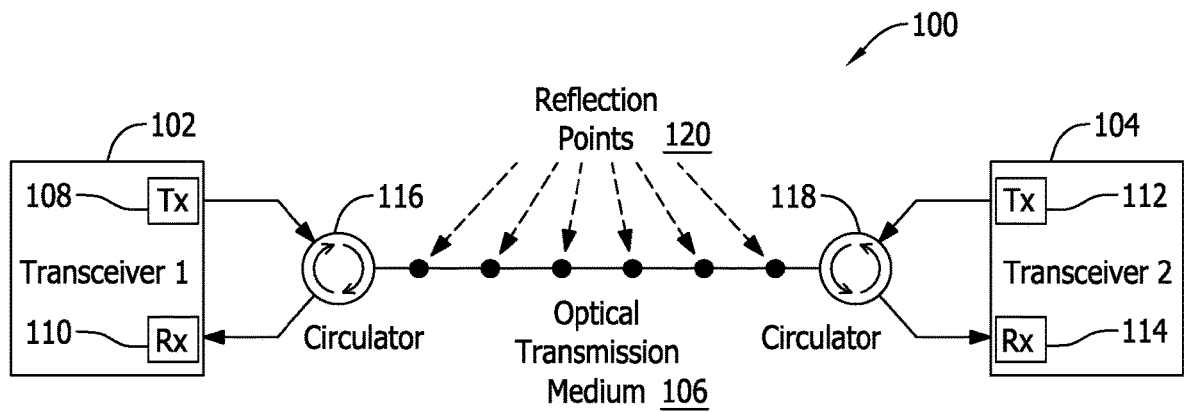
FIG. 1 is a schematic illustration of a coherent optics system.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

As used herein, unless specified to the contrary, "modem termination system," or "MTS'" may refer to one or more of a cable modem termination system (CMTS), an optical network terminal (ONT), an optical line terminal (OLT), a network termination unit, a satellite termination unit, and/or other termination devices and systems. Similarly, "modem" may refer to one or more of a cable modem (CM), an optical network unit (ONU), a digital subscriber line (DSL) unit/modem, a satellite modem, etc.

As used herein, the term "database" may refer to either a body of data, a relational database management system (RDBMS), or to both, and may include a collection of data including hierarchical databases, relational databases, flat file databases, object-relational databases, object oriented databases, and/or another structured collection of records or data that is stored in a computer system.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable nonvolatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include computer program storage in memory for execution by personal computers, workstations, clients, and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As described herein, a "PON" generally refers to a passive optical network or system having components labeled according to known naming conventions of similar elements that are used in conventional PON systems. For example, an OLT may be implemented at an aggregation point, such as a headend/hub, and multiple ONUs may be disposed and operable at a plurality of end user, customer premises, or subscriber locations. Accordingly, an "uplink transmission" refers to an upstream transmission from an end user to a headend/hub, and a "downlink transmission" refers to a downstream transmission from a headend/hub to the end user, which may be presumed to be generally broadcasting continuously (unless in a power saving mode, or the like).

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

The embodiments described herein provide innovative systems and methods for full-duplex coherent optics, that is, bidirectional (BiDi) coherent optics networks. More particularly, the present techniques significantly improve spectral efficiency in both directions of a single fiber in the BiDi network, utilizing the same wavelength and simultaneous transmission over the same fiber, thereby doubling the spectral efficiency of existing coherent transmission systems or networks. The present embodiments thus represent new and improved systems, methods, and mechanisms for compensating for multipath and reflection impairments experienced in full duplex coherent optical transmission systems.

FIG. 1 is a schematic illustration of a coherent optics system 100. In an exemplary embodiment, system 100 includes a first transceiver 102 and a second transceiver 104 in operable communication with one another over an optical transmission medium 106 (e.g., an optical fiber or a single mode fiber (SMF)). In the example depicted in FIG. 1, system 100 represents a full duplex coherent optical link configured to perform bidirectional transmission simultaneously over a single fiber of optical transmission medium 106 using the same wavelength (or frequency) within the same fiber. In an exemplary embodiment, first transceiver 102 includes a first transmitting portion 108 (e.g., a coherent optical transmitter) and a first receiving portion 110 (e.g., a coherent optical receiver), and second transceiver 104 similarly includes a second transmitting portion/transmitter 112 and a second receiving portion/receiver 114. As depicted in FIG. 1, first and second transceivers 102, 104 may be disposed, for example, at the MTS of a headend/hub, or at the modem of customer premises equipment.

In an exemplary embodiment, first transceiver 102 is coupled to optical transmission medium 106 by a first optical circulator 116, and second transceiver 104 is coupled to optical transmission medium 106 by a second optical circulator 118. First and second optical circulators 116, 118 may, for example, function to discriminate between the forward and reverse directions of transmission over medium 106. In this example, because full-duplex transmission is equal in both directions, the terms "forward" and "reverse" are substantially arbitrary, and are intended only to distinguish one direction of transmission flow relative to the other. In contrast, non-coherent optical systems traditionally refer to "downstream" and "upstream" directions, which conventional terms convey less descriptive significance for the full-duplex system. In an embodiment, optical transmission medium 106 may include one or more reflection points 120.

Exemplary architectures, techniques, and mechanisms of coherent optical networks and systems are described in further detail in U.S. Pat. No. 9,912,409, issued Mar. 6, 2018, and U.S. Pat. No. 10,200,123, issued Feb. 5, 2019, and in co-pending U.S. patent application Ser. No. 16/191,435, filed Nov. 14, 2018, co-pending U.S. patent application Ser. No. 16/274,152, filed Feb. 12, 2019, and co-pending U.S. patent application Ser. No. 16/408,285, filed May 9, 2019, the disclosures of which are incorporated by reference herein. Additionally, the person of ordinary skill in the art will understand that system 100 is simplified for ease of explanation, does not necessarily illustrate all components that may be implemented within a full-duplex optical communication system. For example, although system 100 may be particularly suited for implementation in the access environment, where link distances are typically short enough to require no additional amplification or other directional elements that may interfere with bidirectional single wavelength transmission. Nevertheless, exemplary full-duplex amplification systems and techniques for managing long link distances are described in further detail in co-pending U.S. patent application Ser. No. 16/177,428, filed Nov. 1, 2018, the disclosure of which is also incorporated by reference herein.

Figure 2:
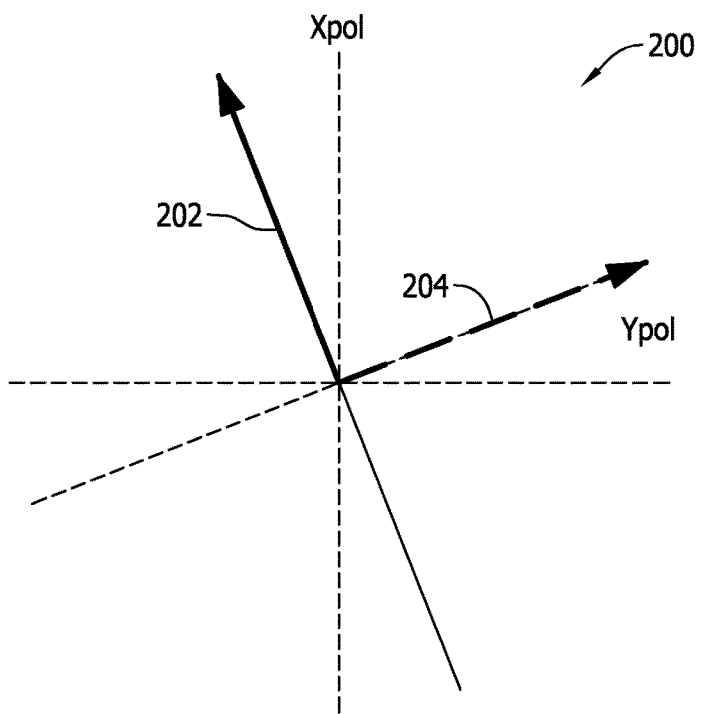
FIG. 2 is a graphical illustration of a dual polarization signal of the first transceiver depicted in FIG. 1.

FIG. 2 is a graphical illustration of a dual polarization signal 200 of first transceiver 102, FIG. 1. In an exemplary embodiment, at a first end of the full duplex coherent link of coherent optics system 100, first transceiver 102 transmits dual polarization signal 200 having a first orthogonal polarization 202 and a second orthogonal polarization 204. In this example, both of first and second orthogonal polarizations 202, 204 are transmitted by first transmitter 108, and include independent components in both of the X and Y directions (i.e., x-axis and y-axis, respectively). In the exemplary embodiment, first and second orthogonal polarizations 202, 204 are received at second receiver 114 as predominantly a signal having a distinct X-polarization portion ($X_{pol}$) and a distinct Y-polarization portion ($Y_{pol}$). That is, assuming an optical transmission environment having negligible reflections from reflection points 120, and further assuming substantially minor polarization crosstalk effects at first and second transmitters 108, 112, second receiver 114 is expected to receive predominantly X and Y polarizations.

Figure 3:
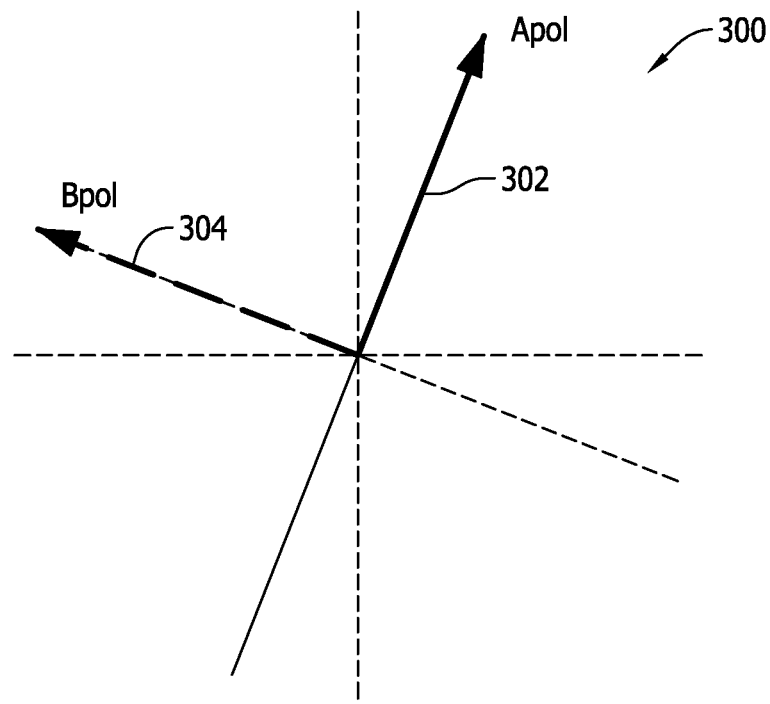
FIG. 3 is a graphical illustration of a dual polarization signal of the second transceiver depicted in FIG. 1.

FIG. 3 is a graphical illustration of a dual polarization signal 300 of second transceiver 104, FIG. 1. In an exemplary embodiment, dual polarization signal 300 is similar to dual polarization signal 200, except that dual polarization signal 300 represents the opposite transmission from second transceiver 104 having a first orthogonal polarization 302 and a second orthogonal polarization 304. In this example, first and second orthogonal polarizations 302, 304 include orthogonally polarized components predominantly in the A and B directions (i.e., $A_{pol}$ and $B_{pol}$, respectively). That is, assuming again an optical transmission environment having negligible reflections from reflection points 120 and substantially minor transmitter polarization crosstalk effects, first receiver 110 is expected to receive predominantly A and B polarizations. The optical transmission environment, as perceived by receivers 110, 114, is described further below with respect to FIG. 4.

Figure 4:
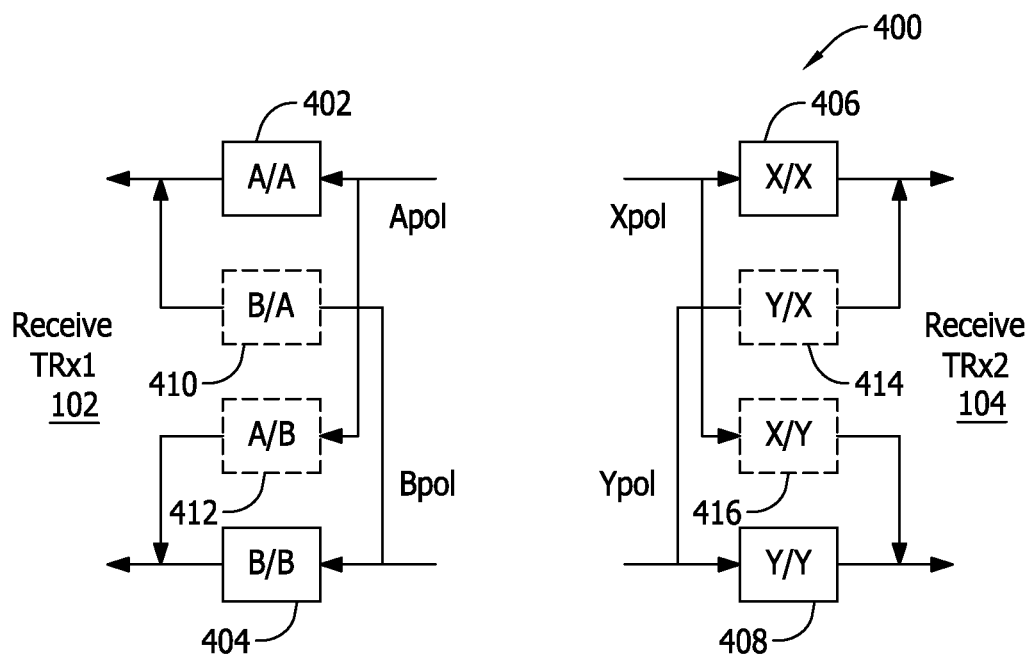
FIG. 4 is a schematic illustration of a first order transmission environment of the transceivers depicted in FIG. 1.

FIG. 4 is a schematic illustration of a first order transmission environment 400 of first transceiver 102 and second transceiver 104, FIG. 1. More particularly, first order transmission environment 400 schematically depicts and exemplary first order approximation of the transmission environment that is perceived by the respective receivers of first receiver 102 (i.e., receiver 110) and second transceiver 104 (i.e., receiver 114).

In an embodiment, for first transceiver 102, environment 400 includes a first logical filter block 402 for the predominant A-polarization signal (or A/A filter 402), and a second logical filter block 404 for the predominant B-polarization signal (or BB filter 404). Similarly, for second transceiver 104, environment 400 includes a third logical filter block 406 for the predominant X-polarization signal (or X/X filter 406), and a fourth logical filter block 408 for the predominant Y-polarization signal (or Y/Y filter 408). Additionally, first transceiver 102 further includes a first crosstalk filter block 410 to compensate for polarization crosstalk from the B-polarization signal onto the A-polarization signal (or B/A filter 410), and a second crosstalk filter block 412 to compensate for polarization crosstalk from the A-polarization signal onto the B-polarization signal (or A/B filter 412), and second transceiver 104 further includes a third crosstalk filter block 414 to compensate for polarization crosstalk from the Y-polarization signal onto the X-polarization signal (or Y/X filter 414), and a fourth crosstalk filter block 416 to compensate for polarization crosstalk from the X-polarization signal onto the Y-polarization signal (or X/Y filter 416). In the exemplary embodiment, only minimal polarization crosstalk from polarized signal B onto signal A, and from polarized signal A onto signal B, may be compensated by B/A and A/B filters 410, 412, respectively (and similarly with respect to X-Y crosstalk).

The person of ordinary skill in the art will understand that, for ease of explanation, environment 400 is intended to depict a high-level system structure to compensate for polarization crosstalk, but is not intended to exclude other filters or functional blocks that may be used in a conventional simplex coherent optical link implementation. A complementary implementation of environment 400 with other coherent optical system functional blocks is described further below with respect to FIG. 5.

Figure 5:
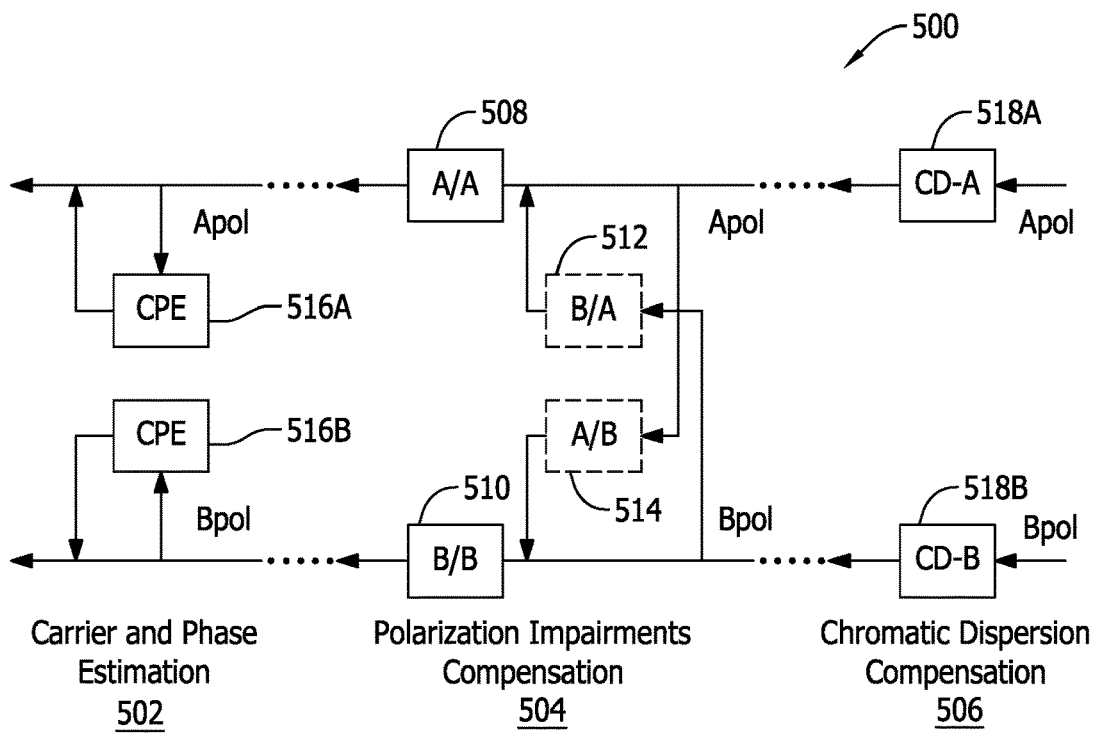
FIG. 5 is a schematic illustration of a receiver functional block architecture for a simplex for a full duplex coherent optical link.

FIG. 5 is a schematic illustration of a receiver functional block architecture 500 for a simplex or a full duplex coherent optical link. In the exemplary embodiment depicted in FIG. 5, architecture 500 represents the logical structure of a single receiver (e.g., receiver 110, FIG. 1) and includes one or more of a carrier and phase estimation (CPE) module 502, a polarization impairment compensation module 504, and a chromatic dispersion (CD) compensation module 506. In this example, polarization impairment compensation module 504 is substantially similar to the full-duplex logical structure for receiver 102 of environment 400, FIG. 4, and includes an A/A filter 508, a BB filter 510, a B/A filter 512, and an AB filter 514. CPE module 502 may include a carrier recovery functional block 516 for each respective polarization signal component, and CD compensation module 506 may include a CD functional block 518 for each respective polarization signal component as well.

In the example depicted in FIG. 5, architecture 500 therefore depicts a complementary implementation of a full-duplex compensation technique (e.g., polarization impairment compensation module 504) together with simplex compensation techniques (e.g., CPE module 502 and CD compensation module 506). That is, whereas the respective functional receiver blocks of module 504 operate to compensate for polarization crosstalk, the respective functional receiver blocks of modules 502, 504 illustrate how additional conventional simplex compensation techniques, such as for chromatic dispersion effects or clock and carrier recovery, may also be optimally implemented within the full-duplex paradigm.

Therefore, in the exemplary embodiment, the predominant orthogonal polarized signals received by first transceiver 102, FIG. 1 (e.g., $A_{pol}$ 302 and $B_{pol}$ 304, FIG. 3), are more advantageously capable of leveraging conventional techniques to equalize multipath effects that are present within the full-duplex transmission. However, through imperfections (e.g., reflection points 120) in transmission medium 106, at each instance of reflection, a polarization rotation may have occurred such that the A and B reflected multipath signals do not align with the dominant portion of the signal that has travelled unimpaired.

Figure 6A:
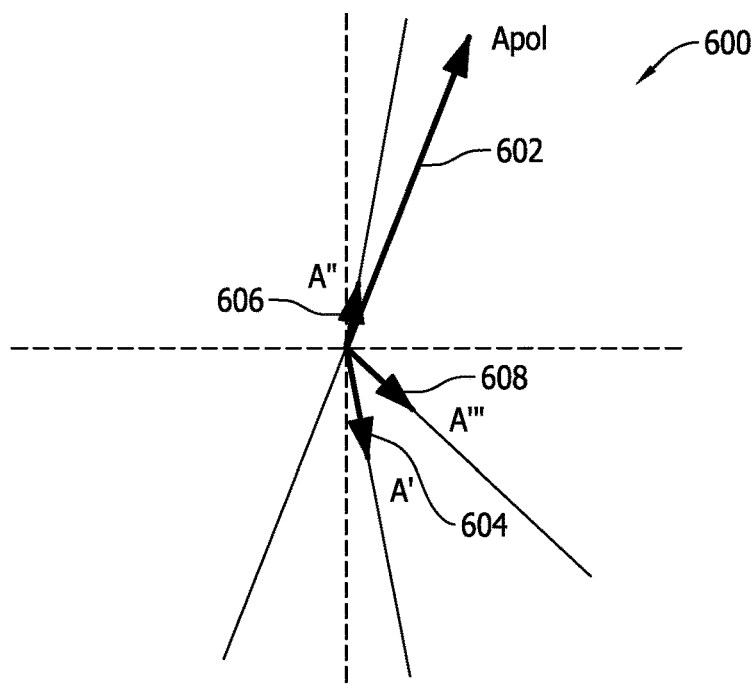
FIG. 6A is a graphical illustration of a single polarization transmission at the receiver of the architecture depicted in FIG. 5.

FIG. 6A is a graphical illustration of a single polarization transmission 600 at the receiver of architecture 500, FIG. 5. More particularly, single polarization transmission 600 represents respective polarization states, at first receiver 110, FIG. 1, in a multipath simplex environment structured according to architecture 500. That is, in the exemplary embodiment, single polarization transmission 600 includes a main polarization component 602 (e.g., $A_{pol}$), a first reflected (i.e., delayed) polarization component 604 (e.g., A'), a second reflected polarization component 606 (e.g., A''), and a third reflected polarization component 608 (e.g., A'''). In other words, single polarization transmission 600 includes the predominant A-polarization directly from second transmitter 112, as well as all reflections of the A-polarization indirectly from one or more reflection points 120.

Figure 6B:
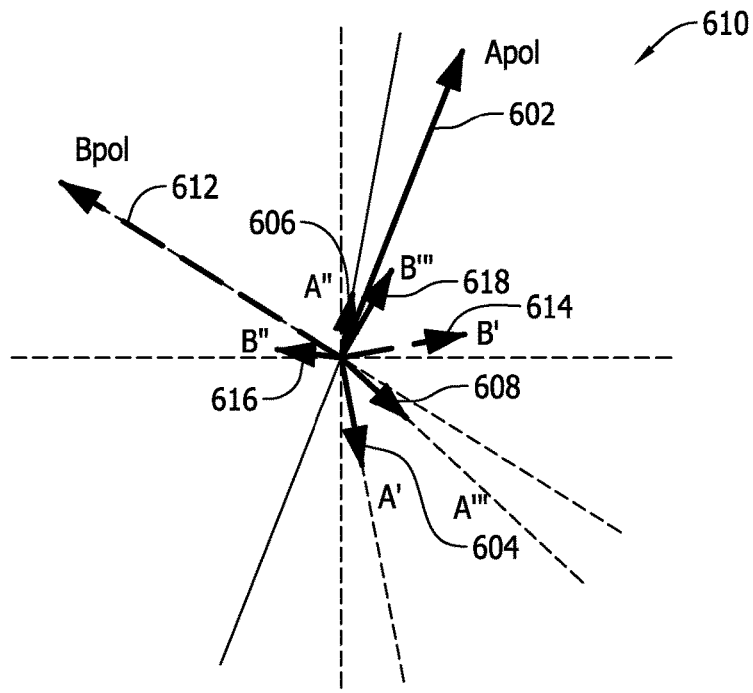
FIG. 6B is a graphical illustration of a dual polarization transmission at the receiver of the architecture depicted in FIG. 5.

FIG. 6B is a graphical illustration of a dual polarization transmission 610 at the receiver of architecture 500, FIG. 5. More particularly, dual polarization transmission 610 also represents respective polarization states in a multipath simplex environment structured according to architecture 500, but at second receiver 114, FIG. 1. That is, in the exemplary embodiment, dual polarization transmission 610 includes the same $A_{pol}$ polarization and reflection components 602, 604, 606, and 608, but also similar orthogonal components with respect to the B-polarization directly from second transmitter 112, as well as all reflections of the B-polarization indirectly from one or more reflection points 120. That is, dual polarization transmission 610 includes a main B-component 612 (e.g., $B_{pol}$), a first reflected polarization component 614 (e.g., B'), a second reflected polarization component 616 (e.g., B''), and a third reflected polarization component 618 (e.g., B''').

However, the exemplary embodiments illustrated above with respect to FIGS. 6A-B our illustrated, for ease of explanation, only with respect to the simplex paradigm. According to the advantageous embodiments described herein though, these principles may be further implemented with respect to the full-duplex coherent optics paradigm. More particularly, in the full-duplex coherent optics system, the main signals of different polarizations, and their respective delayed copies are still present. However, additionally present are copies of the transmitted signal(s) that are back reflected and added to the main signal as further interferers to the main signal. The full duplex paradigm is described further with respect to FIG. 7.

Figure 7:
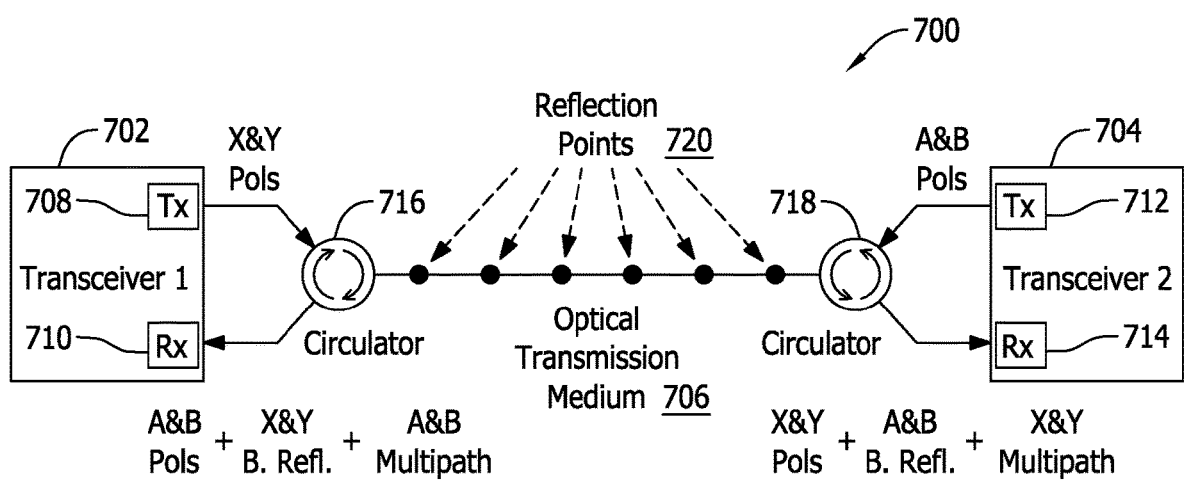
FIG. 7 is a schematic illustration of a coherent optics system.

FIG. 7 is a schematic illustration of a coherent optics system 700. In an exemplary embodiment, system 700 is a full duplex coherent optical link substantially similar to system 100, FIG. 1, and includes a first transceiver 702 in operable communication with a second transceiver 704 over an optical transmission medium 706, a first transmitter 708 and a first receiver 710 within first transceiver 702, a second transmitter 712 and a second receiver 714 within second transceiver 704, a first optical circulator 716, a second optical circulator 718, and a plurality of reflection points 720 along optical transmission medium 706.

In the exemplary embodiment depicted in FIG. 7 though, system 700 is further illustrated to depict that first transmitter 708 transmits predominantly the X and Y polarization signal components ($X_{pol}$ and $Y_{pol}$, respectively) to first optical circulator 716, and that second transmitter 712 transmits predominantly the A and B polarization signal components ($A_{pol}$ and $B_{pol}$, respectively) to second optical circulator 718. Accordingly, system 700 further demonstrates that first receiver 710 receives the dual polarization signal containing the A and B signal components (e.g., dual polarization signal 300, FIG. 3) from second transmitter 712, together with delayed back reflections of the X and Y polarization signal components from first transmitter 708, and copies of the multipath reflections (e.g., $A_{pol}$ reflection components 604, 606, 608, $B_{pol}$ reflection components 614, 616, 618, FIG. 6). Thus, at first receiver 710, all of these received signal components may be further multiplied by a factor in directions coincident with both of the A and B polarized signals.

Accordingly, this composite/distorted signal, Rx(â), which is received at first receiver 710 of first transceiver 702 in the dominant direction of the A polarization signal, may be represented according to the following Eq. 1:

$$Rx(\hat{a})=A+Pol\_Xtlk(B/A)+Multipath(A/A)+Multipath(B/A)+BackRef(X/A)+BackRef(Y/A)$$

where Pol_Xtlk(B/A) represents a polarization crosstalk component of B over A, Multipath (A/A) represents the multipath signal reflections of A in the polarization direction of A, Multipath (B/A) represents the crosstalk multipath signals of B in the polarization direction of A, BackRef (X/A) represents the crosstalk multipath back-reflected signals of X in the polarization direction of A, and BackRef (Y/A) represents the crosstalk multipath back-reflected signals of Y in the polarization direction of A.

Thus, Eq. 1 can be described in greater detail according to the following Eq. 2:

$$Rx(\hat{a}) = A \cdot \sin(\omega t) \cdot \hat{a} + B \cdot \text{Pol\_Xtlk} \cdot \sin(\omega t) \cdot \hat{a} +$$

$$\sum_{i=1}^{n} A \cdot T_i \cdot \sin(\omega(t+t_i) + \emptyset_i)(\hat{a}_i \cdot \hat{a}) +$$

$$\sum_{i=1}^{n} B \cdot T_i \cdot \sin(\omega(t+t_i) + \emptyset_i)(\hat{b}_i \cdot \hat{a}) +$$

$$\sum_{j}^{m} X \cdot \Gamma_j \cdot \sin(\omega(t+t_j) + \psi_j)(\hat{x}_j \cdot \hat{a}) +$$

$$\sum_{j}^{m} Y \cdot \Gamma_j \cdot \sin(\omega(t+t_j) + \psi_j)(\hat{y}_j \cdot \hat{a})$$

where $\hat{a}$ and $\hat{b}$ represent the unitary vectors indicating the direction of polarization of signal components A and B as the respective components arrive into first receiver 710 of first transceiver 702, $\hat{a}_1$ represents the unitary vector indicating the direction of polarization of the first multipath polarized signal component A, $\hat{a}_i$ represents the unitary vector indicating the direction of the $i^{th}$ multipath polarized signal component A, $\hat{a}_i \cdot \hat{a}$, $\hat{b}_i \cdot \hat{a}$, $\hat{x}_j \cdot \hat{a}$ and $\hat{y}_j \cdot \hat{a}$ represent vector products that respectively project vectors $\hat{a}_i$, $\hat{b}_i$, $\hat{x}j$ and $\hat{y}_j$ onto $\hat{a}$, which is the polarization vector of the main signal A. Additionally, $T_i$, $t_i$, and $\emptyset_i$, represent the transmission coefficient, the delay, and the phase, respectively, of the $i^{th}$ multipath signal(s) of A and B, which arrive at first receiver 710 of first transceiver 702 in relation to the main signal component A, and $\Gamma_j$, $t_j$, and $\psi_j$ represent the back-reflection coefficient, the delay, and the phase, respectively, of the $j^{th}$ back-reflected signal(s) of X and Y, which arrives at first receiver 710 of first transceiver 702 in relation to the main signal component A.

In a similar manner, the composite/distorted signal in the dominant direction of the B polarization signal, or $Rx(\hat{b})$, which is also received at first receiver 710 of first transceiver 702, may be described according to the following Eq. 3:

$$Rx(\hat{b}) = B \cdot \sin(\omega t) \cdot \hat{b} + A \cdot \text{Pol\_Xtlk} \cdot \sin(\omega t) \cdot \hat{b} +$$

$$\sum_{i=1}^{n} B \cdot T_i \cdot \sin(\omega(t+t_i) + \emptyset_i)(\hat{a}_i \cdot \hat{b}) +$$

$$\sum_{i=1}^{n} A \cdot T_i \cdot \sin(\omega(t+t_i) + \emptyset_i)(\hat{b}_i \cdot \hat{b}) +$$

$$\sum_{j}^{m} X \cdot \Gamma_j \cdot \sin(\omega(t+t_j) + \psi_j)(\hat{x}_j \cdot \hat{b}) +$$

$$\sum_{j}^{m} Y \cdot \Gamma_j \cdot \sin(\omega(t+t_j) + \psi_j)(\hat{y}_j \cdot \hat{b})$$

In this example, for ease of explanation, it is assumed that the polarization sensitivity of the system components traversed by the signals is negligible. In the case of an environment having non-negligible polarization sensitivity, this sensitivity factor may be addressed by defining specific and/or separate values of $T_i$ and $\Gamma_j$ in the equations listed above. Additionally, some impairments, such as group delay, filter roll-off effects, dispersion, back-scattering, etc., will not be typically discrete in nature, and may require a sufficiently large number of elements to be accurately defined. Nevertheless, the values for n and m are realistically truncated to a practical value in the above equations, for the purposes of more easily describing the concept of the present embodiments. The person of ordinary skill in the art though, will understand that the actual values for n and m elements may be significantly larger.

With respect to cancellation and compensation techniques, referring back to Eq. 1, above, the multipath components of the A polarized signal (e.g., $A_{pol}$ reflection components 604, 606, 608, FIG. 6), along with the main A polarization signal (e.g., $A_{pol}$ 602, FIG. 6), generate a distorted signal that can be compensated by an A/A filter according to the embodiments described above, (e.g., A/A filter 402, FIG. 4). In some embodiments, the respective compensation filters of the present embodiments may employ some conventional equalization techniques (e.g., feed forward equalizers, decision feedback equalizers, etc.), as described further below with respect to FIGS. 8A-B.

Figure 8A:
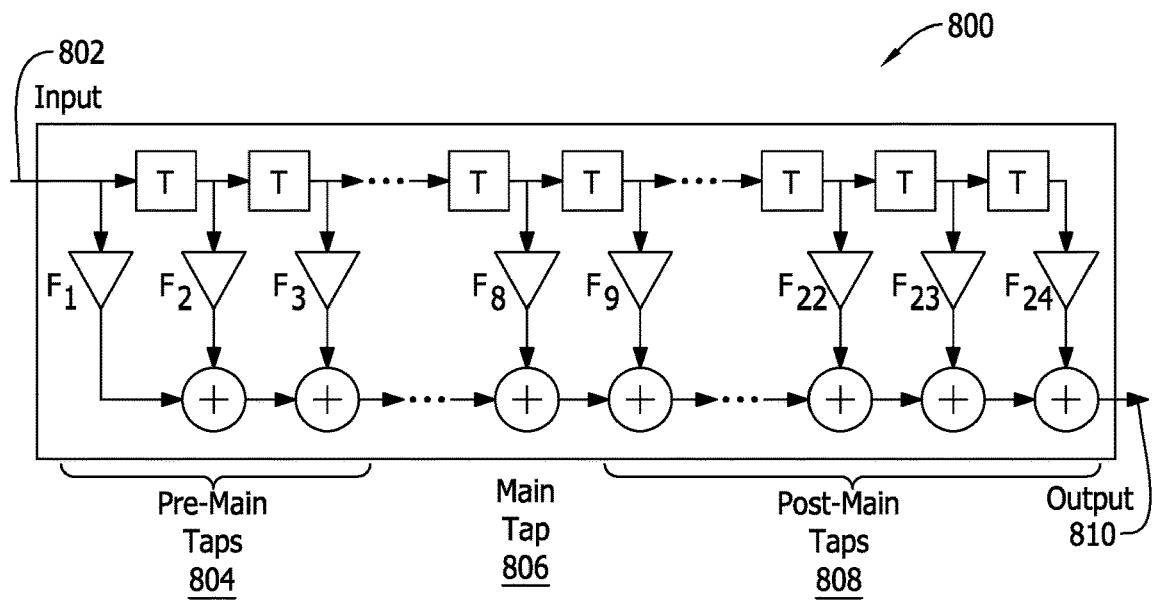
FIG. 8A is a schematic illustration of a feed forward equalizer for the first predominant signal filter depicted in FIG. 4.
Figure 8B:
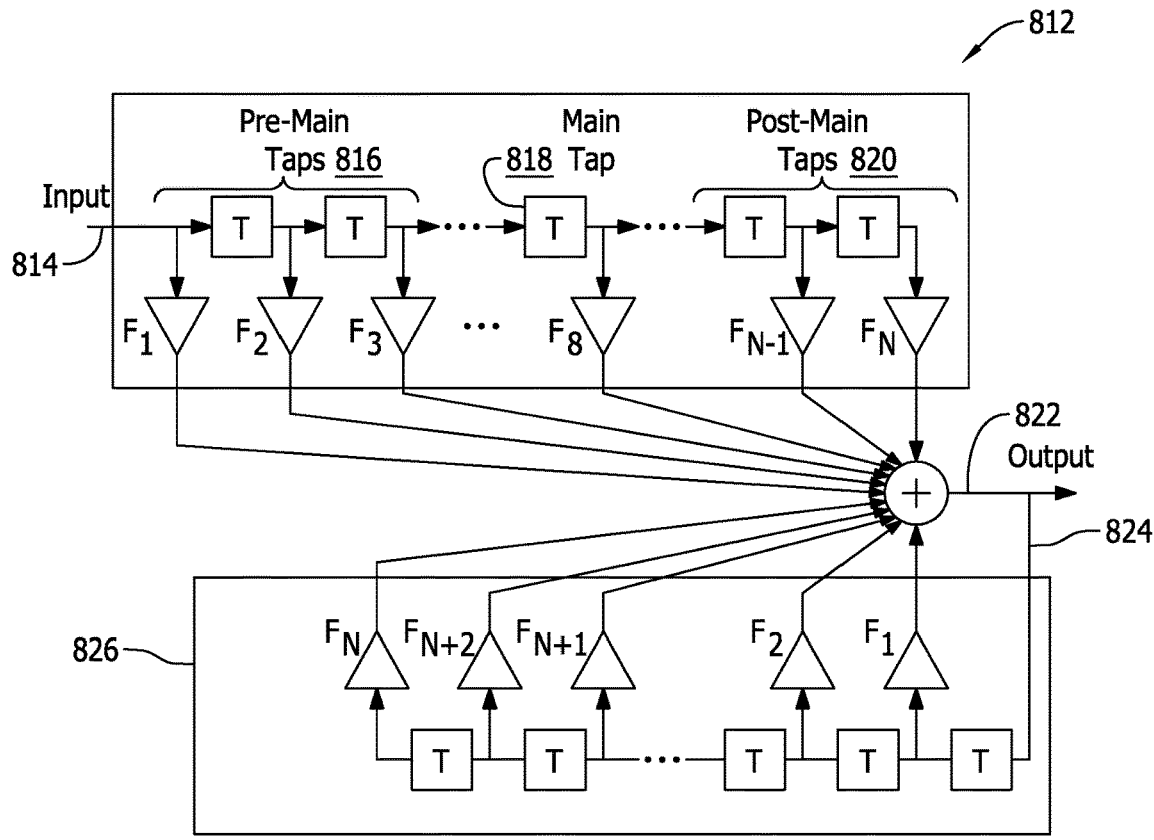
FIG. 8B is a schematic illustration of a decision feedback equalizer for the first predominant signal filter depicted in FIG. 4.

FIG. 8A is a schematic illustration of a feed forward equalizer 800 (FFE 800) for first predominant signal filter 402 (A/A filter 402), FIG. 4. In an exemplary embodiment, FFE 800 includes an input 802, a first region 804 of pre-main taps T, a main tap 806, a second region 808 of post-main taps T, and an output 810. The internal structure and operation of an FFE is otherwise conventionally known, and not described herein in further detail. FIG. 8B is a schematic illustration of a decision feedback equalizer 812 (DFE 812) for first predominant signal filter 402 (A/A filter 402), FIG. 4. That is, in some embodiments A/A filter 402 (as well as the other respective filters/filter blocks) may implement one or more of FFE 800 and DFE 812 to perform equalization, compensation, and/or cancellation of the various signals.

In an exemplary embodiment, DFE 812 is similar to FFE 800, and includes an input 814, a first region 816 of pre-main taps T, a main tap 818, a second region 820 of post-main taps T, and an output 822. DFE 812 differs from FFE 800 in that DFE 812 further includes a feedback loop 824 from output 822, which includes a feedback filter 826 of reverse taps T. The internal structure and operation of an DFE is otherwise conventionally known, and not described herein in further detail. Exemplary operation using such equalizer structures is described further below with respect to FIG. 9.

Figure 9:
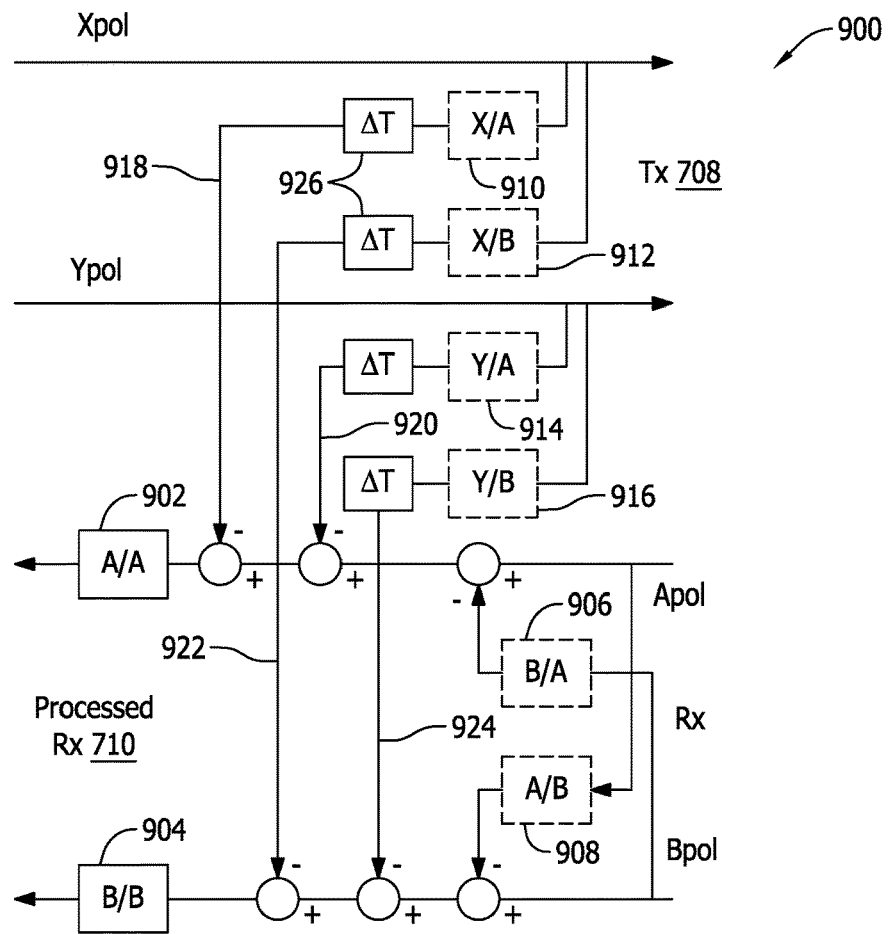
FIG. 9 is a schematic illustration of a multipath architecture for the first transceiver depicted in FIG. 7.

FIG. 9 is a schematic illustration of a multipath architecture 900 for first transceiver 702, FIG. 7. In the example depicted in FIG. 9, architecture 900 is described only with respect to first transceiver 702 for ease of explanation, and not in a limiting sense. The person of ordinary skill in the art will understand how the principles described herein further apply to second transceiver 704, for example, or to a different coherent optical transceiver implemented in a full duplex transmission system or network. In an exemplary embodiment, architecture 900 is particularly useful for the performance of cancellation and equalization processes on the A and B signals received at first transceiver 702.

In an embodiment, architecture 900 includes an A/A filter 902, a B/B filter 904, a B/A filter 906, an A/B filter 908, an X/A filter 910, an X/B filter 912, a Y/A filter 914, and a Y/B filter 916. In exemplary operation, B/A filter 906 uses the $B_{pol}$ signal to generate a B multipath signal to cancel the contribution of the B signal onto the A signal path to A/A filter 902. X/A filter 910 and Y/A filter 914 may then use $A_{pol}$ to respectively generate a first X-reflection signal 918 and a first Y-reflection signal 920 to cancel the contributions of the X and Y signals, respectively, onto the A signal due to back-reflections, and X/B filter 912 and Y/B filter 916 may similarly use $B_{pol}$ to respectively generate a second X-reflection signal 922 and a second Y-reflection signal 924 to cancel the contributions of the X and Y signals, respectively, onto the B signal due to back-reflections. In a similar manner, A/B filter 908 uses the $A_{pol}$ signal to generate an A multipath signal to cancel the contribution of the A signal onto the B signal path to B/B filter 904. Additionally, a variable delay 926 (ΔT, in this example) may be included to effectively align, in time, the respective back reflection signals with the multipath signals.

Architecture 900 thus effectively serves to extract clean version of the polarized A and B signals from the composite/distorted multipath signal. Using one or both of FFE 800 and DFE 812, FIG. 8, for example, the discrete multi-paths and reflections may be compensated using the post-main taps of FFE 800 (e.g., second region 808) and/or the post-main taps and the reverse taps of DFE 812 (e.g., second region 820 and feedback filter 826, respectively). Distributed impairments, such as back-scattering, group delay distortion, filter effects, and dispersion, may be addressed using the pre-main taps (e.g., first regions 804, 816, described further below with respect to FIG. 10).

In further exemplary operation, the polarization crosstalk component may be compensated along the crosstalk multipath (e.g., B/A filter 906). The impact of the B/A multipath crosstalk, as well as that of the relevant crosstalk back-reflections (e.g., X/A filter 910 and Y/A filter 914) may then be compensated through a cancellation technique that leverages the fact that the X and Y polarization signals are known to first transceiver 702, since the $X_{pol}$ and $Y_{pol}$ signals are transmitted by first transmitter 708 of first transceiver 702. In exemplary operation of the cancellation technique, the B polarization signal may also be determined when the A polarization signal is detected, since it is known that $B_{pol}$ is orthogonal to $A_{pol}$, as described above with respect to FIG. 6.

Therefore, the precise signal that is used to cancel unwanted components may be obtained after the equalized signals for multipath (B/A), back-reflection (X/A) and back-reflection (Y/A) (e.g., respectively based on $B_{pol}$, $X_{pol}$, and $Y_{pol}$) are generated, such that these generated equalized signals cancel the component corresponding to the estimated values for multipath (B/A)†, back-reflection (X/A)† and back-reflection (Y/A)†, where the symbol † denotes that the respective parameter is an estimate of the signal needed for cancellation. Furthermore, once the value for the B polarization signal is determined, the relevant polarization crosstalk component may then also be cancelled using an estimated cancellation element −Pol_Xtlk(B/A)†.

In an exemplary embodiment, the cancellation subprocess may occur before the equalization subprocess that compensates the multipath within A/A filter 902, in order to avoid generation of unwanted higher order terms. Referring back to Eq. 1, the cancellation terms described immediately above may be included according to the following Eq. 4:

$$Rx(\hat{a})=A+Pol\_Xtlk(B/A)+\text{Multipath}(A/A)+\text{Multipath}(B/A)-\text{Multipath}(B/A)\dagger+\text{BackRef}(X/A)-\text{BackRef}(X/A)\dagger+\text{BackRef}(Y/A)-\text{BackRef}(Y/A)\dagger$$

which approximately simplifies to the following Eq. 5:

$$Rx(\hat{a})\sim A+\text{Multipath}(A/A)$$

Accordingly, using the equalization mechanism (e.g., FFE 800, DFE 812) provided by the compensation filter for multipath A/A (i.e., A/A filter 902), a "clean" signal for the A polarization may be effectively recovered through these advantageous techniques. One of ordinary skill in the art will appreciate that, for simplicity of explanation, the preceding processes are described with respect the recovery of polarized signal A. Nevertheless, the person of ordinary skill in the art will understand how these principles may be similarly applied to recover the polarized signal B on first transceiver 702, as well as the respective polarized signals X and Y on second transceiver 704.

Figure 10:
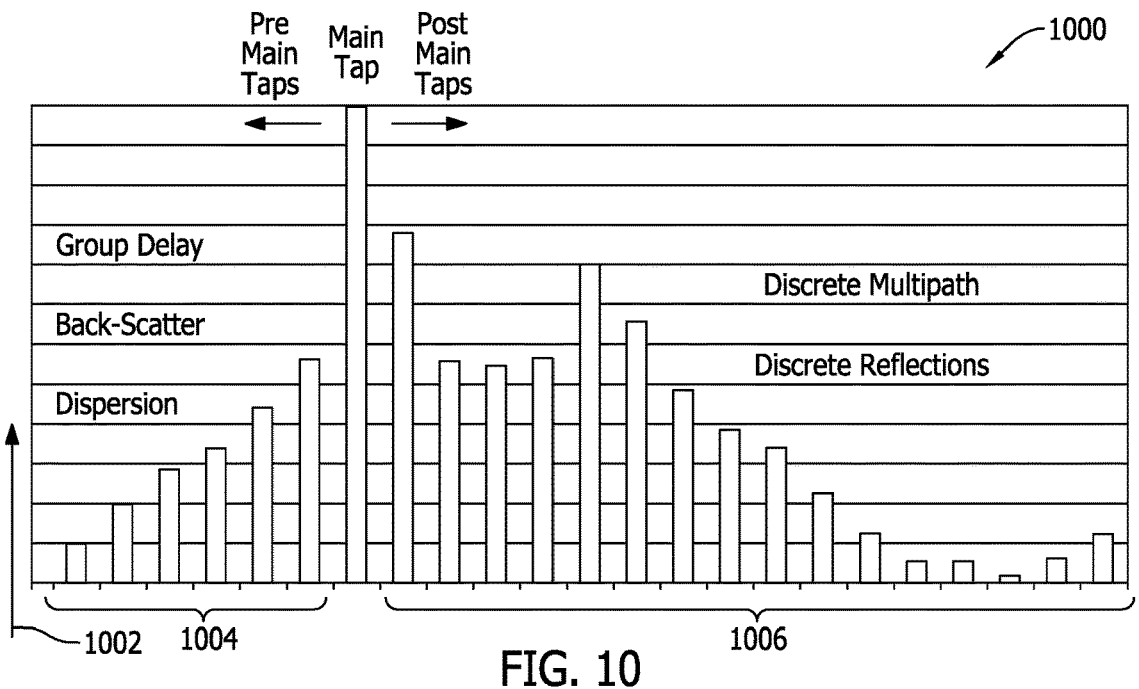
FIG. 10 is graphical illustration of an impairment diagram for the equalizers depicted in FIGS. 8A-B.

FIG. 10 is graphical illustration of an impairment diagram 1000 for equalizers 800, 812, FIGS. 8A, 8B, respectively. In an exemplary embodiment, impairment diagram 1000 depicts a relative distribution of response 1002 according to the respective values of the equalizer taps/coefficients. As illustrated in diagram 1000, distributed impairments, such as group delay, back-scatter, and dispersion, may be addressed (e.g., using the compensation techniques described above with respect to FIG. 9) in a pre-main tap region 1004 (e.g., similar to first regions 804, 816, FIG. 8), and discrete multi-paths and discrete reflections may be similarly address in a post-main tap region 1006 (e.g., similar to second regions 808, 820, and/or feedback filter 826, FIG. 8).

Accordingly, the respective delay times characterizing back-reflections ($t_i$) and multipaths ($t_j$) from the equations above may not be necessarily coincident with the equalizer delay between filter stages (e.g., typically the symbol period or a multiple of the symbol period). Therefore, in an exemplary embodiment, complex values for the filter coefficients (or filter taps) may also be determined as part of the optimization processes described above with respect to FIG. 9.

Figure 11:
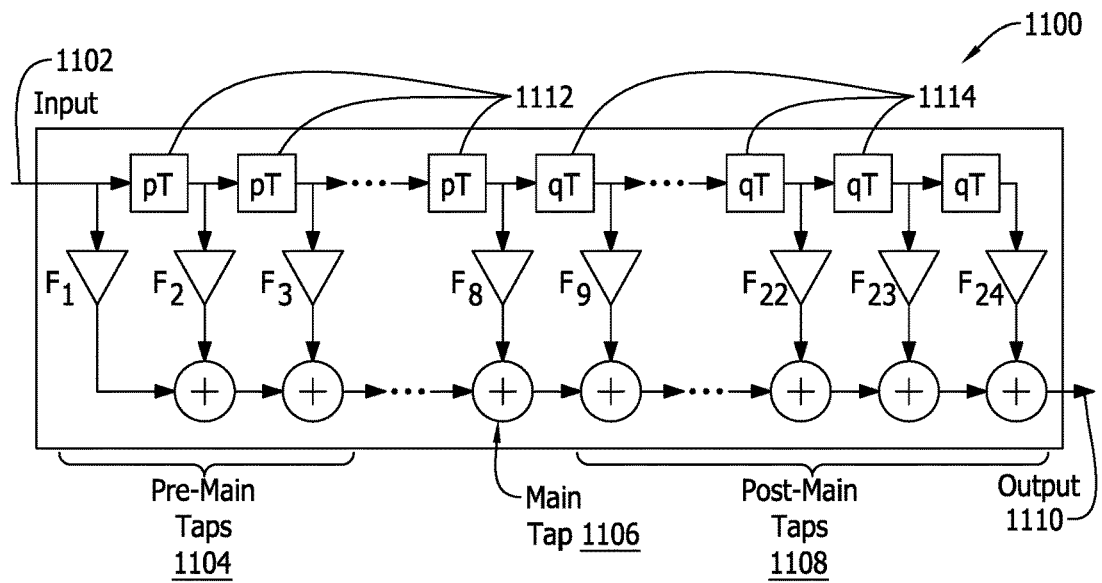
FIG. 11 is a schematic illustration of an alternative feed forward equalizer for the first predominant signal filter depicted in FIG. 4.

FIG. 11 is a schematic illustration of an alternative FFE 1100 for first predominant signal filter 402, FIG. 4. FFE 1100 is similar to FFE 800, FIG. 8A, in structure and function, and similarly includes an input 1102, a first region 1104 of pre-main taps T, a main tap 1106, a second region 1108 of post-main taps T, and an output 1110. FFE 1100 differs though, from FFE 800 in that FFE 1100 represents a filter implementation where the pre-main taps in first region 1104 have a first delay value p that is different from a second delay value q of the post-main taps in second region 1108. In an embodiment, second delay value q is greater than first delay value p. Accordingly, since discrete back reflections and discrete multipaths (e.g., second region 1108) are likely to have significantly different delay characteristics than back scattering and group delay impairments (e.g., first region 1104), FFE 1100 provides an advantageous alternative filter implementation that effectively compensates for uneven delay values between filter stages.

Figure 12:
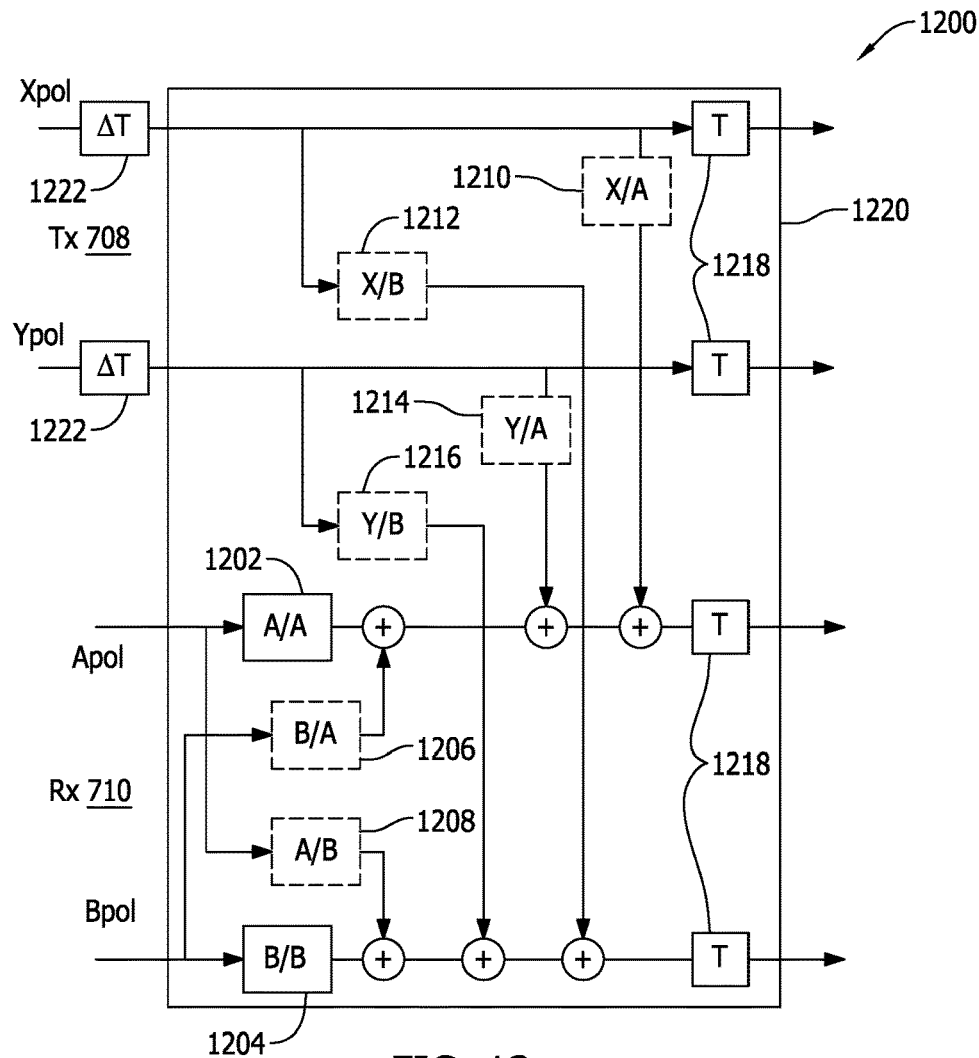
FIG. 12 is a schematic illustration of a two-stage delay subsystem for the multipath architecture depicted in FIG. 9.

FIG. 12 is a schematic illustration of a two-stage delay subsystem 1200 for multipath architecture 900, FIG. 9. In an exemplary embodiment, subsystem 1200 is similar to architecture 900, FIG. 9, and similarly includes an A/A filter 1202, a BB filter 1204, a B/A filter 1206, an AB filter 1208, an X/A filter 1210, an X/B filter 1212, a Y/A filter 1214, and a Y/B filter 1216. Subsystem 1200 differs though, from architecture 900 in that subsystem 1200 further includes a first delay 1218 at the respective path outputs for $X_{pol}$, $Y_{pol}$, $A_{pol}$, and $B_{pol}$ within a single equalization stage 1220. Additionally, subsystem 1200 also may include a variable second delay 1222 (ΔT, in this example) at the respective path inputs for $X_{pol}$, $Y_{pol}$, for alignment of reflection and multipath signals.

According to the exemplary embodiment, subsystem 1200 thus represents a two-stage signal processor, with variable second delay 1222 representing a first stage providing initial alignment delay, and equalization stage 1220 representing a single second stage providing equalization and cancellation. Subsystem 1200 therefore provides an innovative and advantageous alternative architecture that is particularly useful in the case where it is desirable to calculate the respective cancellation and equalization coefficients on the separate delay stages at the time of reception, and thereby resolve impairments from polarization imbalance or from polarization crosstalk irrespective the respective delays actually experienced by the system being implemented.

Figure 13:
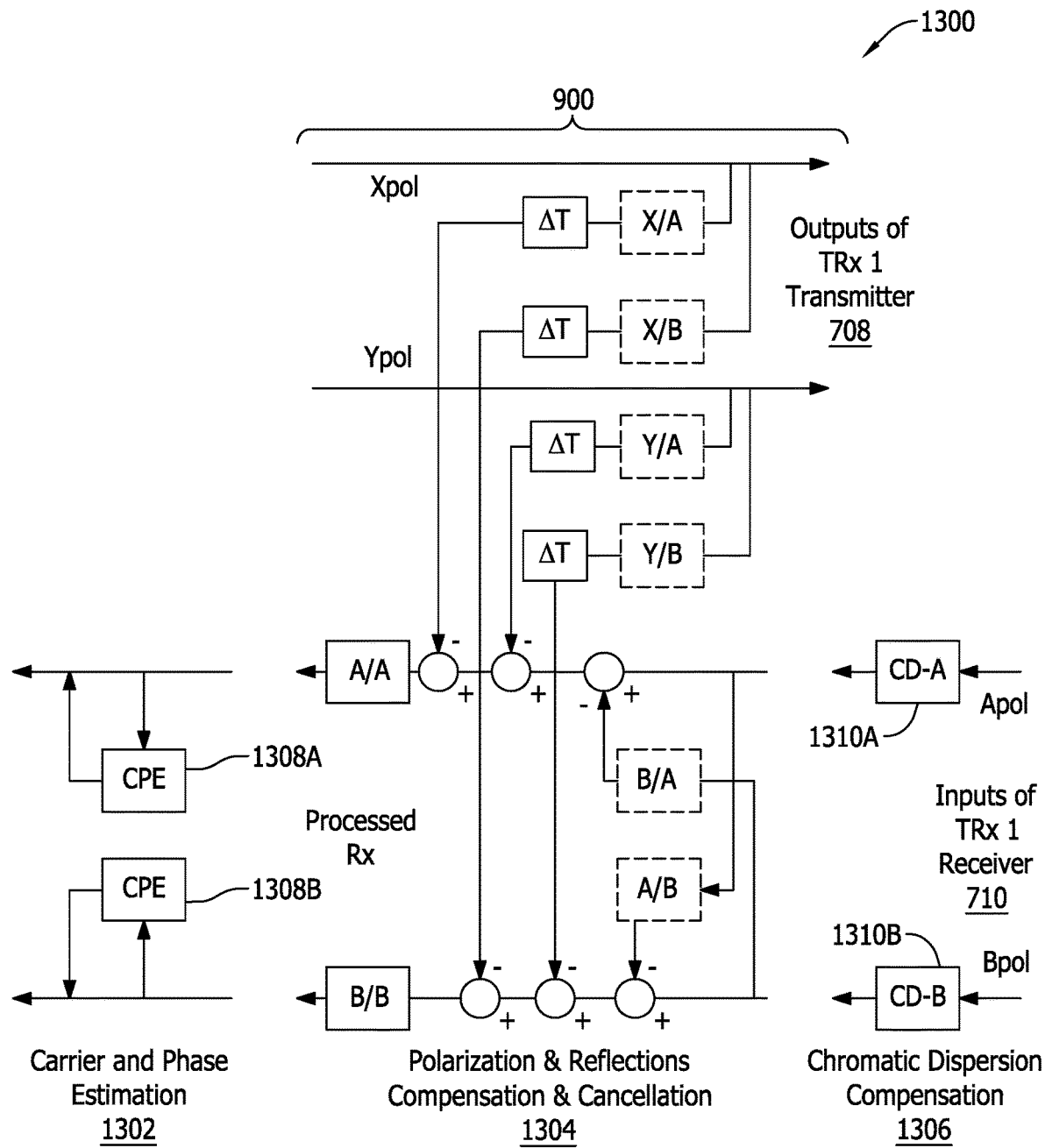
FIG. 13 is a schematic illustration of a functional receiver chain system for the multipath architecture depicted in FIG. 9.

FIG. 13 is a schematic illustration of a functional receiver chain system 1300 for multipath architecture 900, FIG. 9. In an exemplary embodiment, system 1300 is similar to functional block architecture 500, FIG. 5, and similarly includes a CPE module 1302, a polarization and reflection compensation and cancellation module 1304, and a CD compensation module 1306. System 1300 differs though, from architecture 500 in that system 1300 effectively substitutes multipath architecture 900 within polarization and reflection compensation and cancellation module 1304, in the place of polarization impairment compensation module 504, which substantially includes the more basic structural configuration of environment 400, FIG. 4. Similar to architecture 500 though, CPE module 1302 includes a carrier recovery functional block 1308 for each respective polarization signal component, and CD compensation module 1306 includes a CD functional block 1310 for each respective polarization signal component as well. According to the advantageous configuration of system 1300, the entire receiver chain is enabled to effectively implement CD compensation as well as clock and carrier recovery.

In an exemplary embodiment, one or more of the systems and methods described above may further implement training signals to facilitate the estimation of the coefficients of the different equalizers. For example, a training signal/message may include a first period when only the A polarization component of the signal is transmitted, a second period when only the B polarization component of the signal is transmitted, a third period when only the X polarization component of the signal is transmitted, and a fourth period when only the Y polarization component of the signal is transmitted. In at least one embodiment, the training message may be transmitted periodically, to account for changes to the state of polarization with time, or for changes in time regarding the type of reflection and channel impairments.

Exemplary embodiments of full duplex coherent optics systems and methods for communication networks are described above in detail. The systems and methods of this disclosure though, are not limited to only the specific embodiments described herein, but rather, the components and/or steps of their implementation may be utilized independently and separately from other components and/or steps described herein.

Although specific features of various embodiments of the disclosure may be shown in some drawings and not in others, this convention is for convenience purposes and ease of description only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A full duplex communication network, comprising:
    a first coherent optics transceiver including (i) a first receiver, and (ii) a first transmitter configured to transmit a first dual polarized signal;
    a second coherent optics transceiver including (i) a second receiver configured to receive the first dual polarized signal, and (ii) a second transmitter configured to transmit a second dual polarized signal;
    an optical transport medium operably coupling the first coherent optics transceiver to the second coherent optics transceiver; and
    a first compensation subsystem configured to filter (i) crosstalk between orthogonal components of the first dual polarized signal, and (ii) reflections between the first dual polarized signal and the second dual polarized signal.

2. The network of claim 1, wherein the optical transport medium comprises a single mode optical fiber.

3. The network of claim 2, wherein the first transmitter is configured to transmit the first dual polarized signal simultaneously with a transmission by the second coherent optics transceiver of the second dual polarized signal over the same single mode optical fiber.

4. The network of claim 2, wherein the reflections are received from one or more reflection points along the single mode optical fiber.

5. The network of claim 1, further comprising a first optical circulator configured to couple the first coherent optics transceiver to a first end of the optical transport medium, and a second optical circulator configured to couple the second coherent optics transceiver to a second end of the optical transport medium opposite the first end.

6. The network of claim 5, wherein the first optical circulator is configured to discriminate between a forward direction of the first dual polarized signal from the first transmitter and a reverse direction of the second dual polarized signal toward the first receiver.

7. The network of claim 6, wherein the first dual polarized signal comprises (i) an X-polarization component, and (ii) a Y-polarization component orthogonal to the X-polarization component.

8. The network of claim 7, wherein the second dual polarized signal comprises (i) an A-polarization component, and (ii) a B-polarization component orthogonal to the A-polarization component.

9. The network of claim 8, wherein the first compensation subsystem includes a polarization impairment compensation module.

10. The network of claim 9, wherein the first compensation subsystem further includes one or more of a carrier and phase estimation module and a chromatic dispersion module.

11. The network of claim 9, wherein the first compensation subsystem further includes (i) a first compensation filter configured to pass predominantly the A-polarization component, and (ii) a second compensation filter configured to pass predominantly the B-polarization component.

12. The network of claim 11, wherein the first compensation filter includes one or more of a feed forward equalizer and a decision feedback equalizer.

13. The network of claim 12, wherein the first compensation filter further includes a main tap, a plurality of pre-main taps, and a plurality of post-main taps.

14. The network of claim 13, wherein the first compensation filter is configured to compensate for impairments including one or more of group delay, back scatter, and dispersion, using coefficients of the plurality of pre-main taps.

15. The network of claim 13, wherein the first compensation filter is configured to compensate for impairments including one or more of discrete multipath and discrete reflections, using coefficients of the plurality of post-main taps.

16. The network of claim 13, wherein a first delay value of the plurality of post-main taps is greater than a second delay value of the plurality of pre-main taps.

17. The network of claim 11, wherein the first compensation subsystem further includes an initial alignment stage having a variable delay applied to the first dual polarized signal.

18. The network of claim 11, wherein the first compensation subsystem further includes (i) a first crosstalk filter configured to inhibit crosstalk from the B-polarization component to the A-polarization component, and (ii) a second crosstalk filter configured to inhibit crosstalk from the A-polarization component to the B-polarization component.

19. The network of claim 11, wherein the first compensation subsystem further includes (i) a first reflection filter configured to inhibit back reflections from the X-polarization component to the A-polarization component, (ii) a second reflection filter configured to inhibit crosstalk from the Y-polarization component to the A-polarization component, (iii) a third reflection filter configured to inhibit back reflections from the X-polarization component to the B-polarization component, and (ii) a fourth reflection filter configured to inhibit crosstalk from the Y-polarization component to the B-polarization component.

20. The network of claim 11, further comprising a second compensation subsystem disposed at the second optics transceiver.

* * * * *